United States Patent [19]
Gleeman et al.

[11] Patent Number: 5,454,036
[45] Date of Patent: Sep. 26, 1995

[54] ATTENDED MESSAGING MACHINE

[76] Inventors: Alan N. Gleeman; Robert J. Gleeman, both of 97 Eldora Dr., Mountain View, Calif. 94041

[21] Appl. No.: 260,073

[22] Filed: Jun. 15, 1994

[51] Int. Cl.⁶ .............................. H04M 9/00; H04M 1/62
[52] U.S. Cl. .............................. 379/392; 379/69; 379/88; 379/391; 379/442
[58] Field of Search .................. 379/67, 69, 78, 379/85, 86, 87, 88, 89, 387, 388, 389, 390, 391, 392, 442, 395, 397, 70

[56] References Cited

U.S. PATENT DOCUMENTS

| | | | |
|---|---|---|---|
| 1,548,028 | 10/1918 | Egerton | 379/86 |
| 3,728,486 | 4/1973 | Kraus | 379/64 |
| 3,863,029 | 1/1975 | Zimmermann | 379/87 |
| 4,001,508 | 1/1977 | Johnson | 379/69 |
| 4,359,607 | 11/1982 | Hannig et al. | 379/70 |
| 4,406,925 | 9/1983 | Jordan et al. | 379/69 X |
| 4,446,335 | 5/1984 | Lee et al. | 379/85 |
| 4,605,975 | 8/1986 | Beaman | 379/87 |
| 4,718,083 | 1/1988 | Boeckmann | 379/392 |
| 4,734,930 | 3/1988 | Quiros et al. | 379/88 |
| 4,817,127 | 3/1989 | Chamberlin et al. | 379/67 |
| 4,930,156 | 5/1990 | Norris | 379/388 |
| 4,941,168 | 7/1990 | Kelly, Jr. | 379/69 |
| 4,959,852 | 9/1990 | Kern et al. | 379/70 |
| 4,993,060 | 2/1991 | Kelly | 379/87 |
| 5,029,198 | 7/1991 | Walpole et al. | 379/88 |
| 5,075,894 | 12/1991 | Iwase et al. | 379/69 |
| 5,241,584 | 8/1993 | Hardy et al. | 379/67 |
| 5,353,347 | 10/1994 | Irissou et al. | 379/395 |

FOREIGN PATENT DOCUMENTS

| | | | |
|---|---|---|---|
| 0223370 | 11/1985 | Japan | 379/85 |
| 62-048926 | 5/1987 | Japan | 379/392 |
| 0233857 | 9/1989 | Japan | 379/85 |
| 0063253 | 3/1990 | Japan | 379/391 |
| 0305160 | 12/1990 | Japan | 379/85 |
| 5167716 | 7/1993 | Japan | 379/69 |
| 5-284207 | 10/1993 | Japan | 379/391 |

*Primary Examiner*—Jeffery A. Hofsass
*Assistant Examiner*—Scott L. Weaver
*Attorney, Agent, or Firm*—Schneck & McHugh

[57] ABSTRACT

An attended messaging system having an audio message recording and playback device connected in series between a telephone base unit and a telephone receiver handset or headset. The recording and playback device includes a solid-state audio memory chip for storing a message and pairs of operational amplifiers connecting the memory chip of the recoding and playback device with the telephone base unit and with the speaker and microphone of the telephone receiver handset or headset in a differential circuit of audio signal channels. The recording and playback device is manually-actuable by means of buttons or switches to operate in a recording mode, in which a message spoken into the handset or headset microphone is stored in the audio memory chip, or in a playback mode, in which the previously recorded message is communicated through the telephone base unit and telephone line to a designated remote telephone station with which audio communication has been established by the telephone base unit. When the recording and playback device is inactive, i.e., in neither the recording or playback mode, a person can communicate with a party at the remote telephone station through the telephone receiver handset or headset. Excessively loud sidetone in the handset or headset speaker is avoided by arranging the polarity and signal strengths of the sidetone signals from telephone base unit and recording and playback device to combine in phase opposition in a 2X—X manner.

15 Claims, 5 Drawing Sheets

ATTENDED MESSAGING MACHINE

TECHNICAL FIELD

The present invention relates to telephone communications with audio message storage and retrieval, and, in particular, relates to a telephone accessory in which an audio signal can be recorded and subsequently reproduced for transmission over a telephone line.

BACKGROUND ART

Sales people who use the telephone in their work currently reach telephone answering machines and automated voice mail systems about 50 percent of the time. Sales people are then forced to choose between disconnecting, with a net loss on the call, or giving their ace sales pitch to a machine. Time after time, they must expend a great deal of time and effort in order to leave messages on these answering machines and voice mail systems, messages which hopefully are well thought out, upbeat and interesting, even through they know that many of their messages will never be returned. This can be very frustrating, and many sales people quickly lose their enthusiasm for selling to such machines, and, consequently, fail to make their best sales presentation when confronted with an answering machine or voice mail system. This decrease in salesmanship can eventually carry over even to calls answered by real people, leading to a reduction in a sales person's overall effectiveness. It would be better if a system were available that allowed sales people to focus all of their energy on live, real time buyer prospects, while still allowing an effective sales message to be presented whenever answering machines and voice mail systems are reached.

Automated telephone message systems of various kinds do already exist. Among them are the familiar answering machine and voice mail systems, as well as caller-controlled systems that allow selection of several prerecorded messages. These latter caller-controlled systems are used by businesses and government agencies, such as the IRS, which receive a large volume of calls requesting certain kinds of information with great frequency. The system includes an automated telephone exchange and multiple message recording and playback units that have been prerecorded with frequently requested information. A caller can access the desired prerecorded information on a particular unit remotely by pressing one or more of the buttons on their own telephone, selected according to instructions received from the answering system itself or from published instructions previously made available to the caller. A selection may also be available that connects the caller to a person who can answer less frequently asked questions.

Message distribution systems have also been devised. These kinds of systems include an automatic dialing feature which originates a phone call to a designated station, and then, when a connection has been established, transmits a prerecorded audio message to the called telephone. When the message has been delivered, the line is disconnected, and the cycle is repeated for another telephone station. In this way, a sequence of designated stations can be called and the prerecorded message can be distributed automatically to a large number of telephone stations. The use of such systems has been severely restricted in recent years and their use for making huge numbers of unsolicited sales presentations is now prohibited by law as a form of harassment. Such systems, because they involve automatic dialing, require that the device be connected directly to the telephone line. Because of the direct connection, transient suppressors, relays and other safety components are required by the device.

An object of the present invention is to provide a messaging system that allows a sales person who reaches an answering machine or voice mail system to transmit a prerecorded message while also allowing the sales person to communicate directly with real people.

DISCLOSURE OF THE INVENTION

The above object has been met with an attended messaging system that uses a record/playback device that can be plugged into the telephone between the telephone's base unit and the handset, using the keypad of the telephone base for dialing by the sales person and the telephone's handset for speaking or listening in the usual way. A hands-free headset could be substituted for the standard handset. The system allows all or part of an outgoing sales message to be prerecorded and subsequently played into a voice mail system or answering machine, if one answers, or not played at all if a real person answers, and even allows the user to speak first, then play a prerecorded message, then speak again. Any combination of speaking and playing of a prerecorded message is possible. The sales person simply presses a button to deliver his or her presentation message to the contacted party, whether a person or a machine. The sales person can use the time gained to log the call and prepare for the next call while the message is being played.

The system is a linear switchless arrangement of telephone base unit, one or more playback and recording devices, and handset or headset speaker. It uses pairs of operational amplifiers in a single power supply voltage dc circuit to create a differential amplifier circuit within the connecting playback and recording device for making the audio connections to the base unit and handset without the need for large coupling capacitors to drive the transformer and resistor loads in those audio devices. The system uses the handset or headset speaker to record the message into the solid-state storage chip in the recording and playback device. Sidetone is provided by the recording and playback device to listen to the recorded message through the handset or headset speaker. Too much sidetone is avoided by making the sidetone provided in the recording and playback device of opposite polarity from that provided by the telephone base unit and by making that provided by the base unit at twice the signal strength as that from the recording and playback device.

BRIEF DESCRIPTION OF THE DRAWING

FIG. 2A shows the differential amplifier connections, FIG. 2B shows the power supply circuitry, FIG. 2C shows the user-controlled activation circuitry, FIG. 2D shows a recording timer circuit relating to storage capacity, and FIG. 2E shows the connections for the storage chip itself.

BEST MODE FOR CARRYING OUT THE INVENTION

Figure 1:
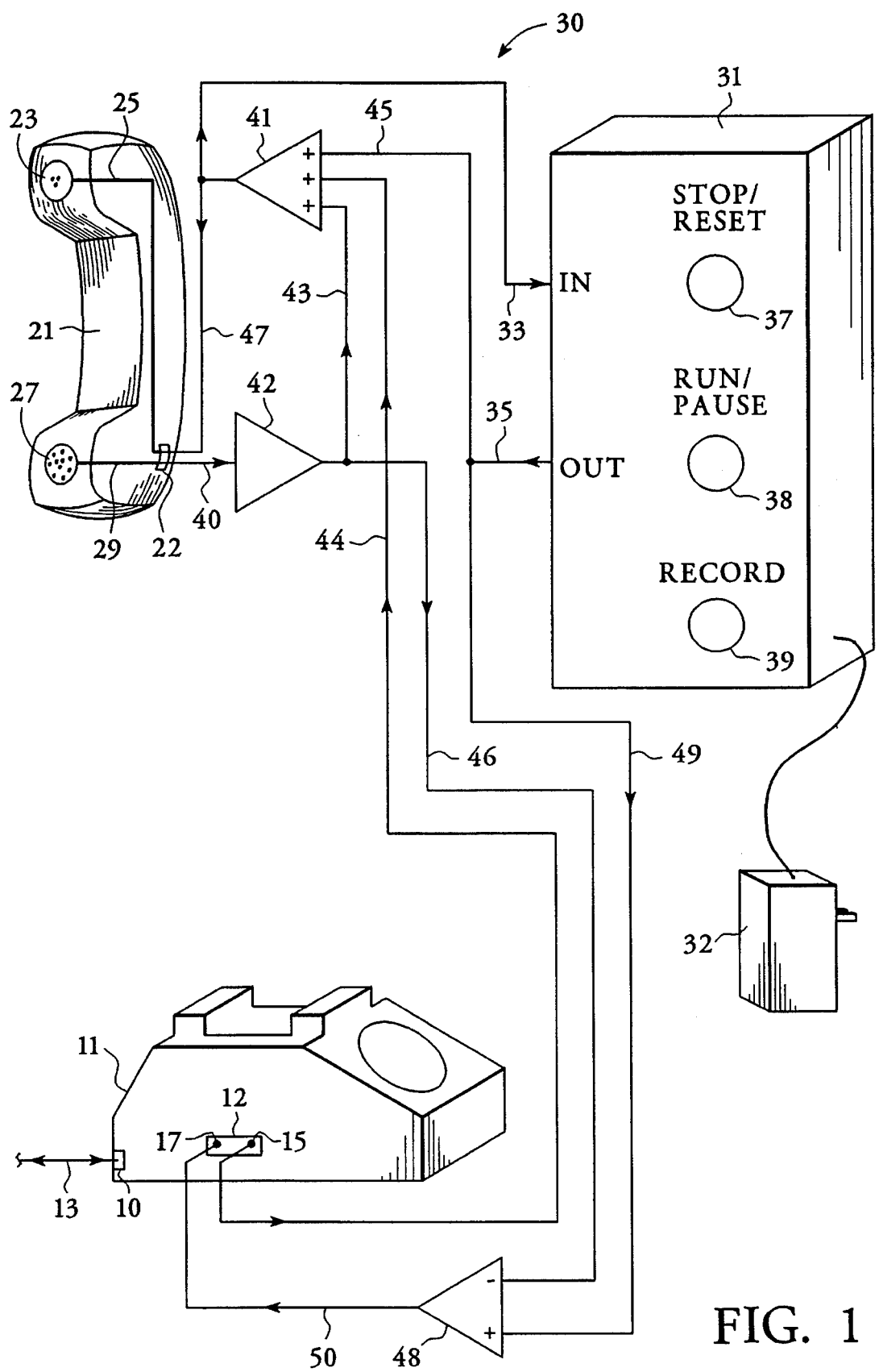
FIG. 1 is a schematic view of the overall messaging system of the present invention, showing a telephone base unit 11, a recording and playback device and a handset 21.

With reference to FIG. 1, an attended messaging system of the present invention has a telephone instrument or base unit 11 which is connected through a modular phone jack 10 to an outside telephone line 13, part of a much larger telephone system. The base unit 11 has the keypad or rotary dialer for initiating telephone calls over the outside telephone line 13 to other telephone stations designated by a telephone number address. The base unit 11 also includes another modular jack 12 connecting to receiving and transmitting lines 15 and 17, which in most telephone stations not part of the invention are connected to the speaker 23 and microphone 27 of a telephone handset or headset 21, but in this invention are connected to a recording and playback device 30. The handset or headset 21 is in turn connected in the present invention to the recording and playback device 30 through another modular jack 22, part of the handset or headset 21, and thus is only indirectly connected to the base unit 11.

The telephone handset or headset 21 of the attended messaging system of the present invention is an ordinary telephone receiver with a speaker 23 through which an electrical signal on a handset or headset input line 25 is converted to an audio message that can be heard by the user and with a microphone 27 converting a spoken audio message to an electrical signal on a handset or headset output line 29. The telephone handset or headset 21 has a modular phone jack 22 through which the input and output lines 25 and 29 are connected to the recording and playback device 30 of the present invention.

The recording and playback device 30 includes a solid-state record/playback circuit 31, amplifiers 41, 42 and 48 and pairs of conductive lines connecting the base unit and handset (or headset) modular jacks 12 and 22 to the circuit 31. The device 30 is powered through an external self-contained wall adaptor unit 32. A set of user-activated manual switches, such as a stop/reset button 37, a run/pause button 38 and a record button 39, allow a user to control operation of the recording and playback device 30. Any of a variety of standard recording technologies, including magnetic or optical tape or disk drives, may be used, but a solid-state audio memory chip is preferred for its compactness, rapid access, long life, and low cost. Such a chip can store up to one or two minutes of a digitized audio message, which is adequate for most sales applications.

The three audio devices, i.e., the telephone base unit 11, the recording and playback device 30 and the handset or headset 21, provide a total of six audio channels, one input and one output for each device, which may be distributed in a general way to accomplish the attended messaging function as well as other desirable functions. The input channel 47 to the handset or headset speaker 23 combines the signals from the handset or headset's own microphone output channel 40 and 43, the telephone's base unit's output channel 44, and the output channel 35 and 45 from the recording and playback device 31. Therefore, the differential amplifier 41 produces a signal which is the combination of all signal sources on inputs 43–45. The input channel 50 to the telephone base unit 11 combines the signals from the handset or headset microphone output channel 40 and 46 and the output channel 35 and 49 from the recording and playback device 31. The input channel 33 to the recording and playback device 31 receives signals from the differential amplifier 41 and may therefore record live conversations, as well as messages for later transmission. Alternatively, the microphone output channel may be combined with a channel from an optional tape input jack. Considering the audio channels coming out of each of the three devices, the output channel 44 from the telephone base unit 11 provides a signal to the handset or headset speaker 23. The handset or headset microphone 27 provides a signal in its output channel 40 and 46 to the telephone base unit's input channel 50, and to its speaker 23 through its output channel 40 and 43. The recording and playback unit's output channel 35 provides its signal to both the telephone base unit's input channel 49 and 50 and the handset or headset speaker input channel 45 and 47, and optionally to a tape output jack.

Figure 2D:
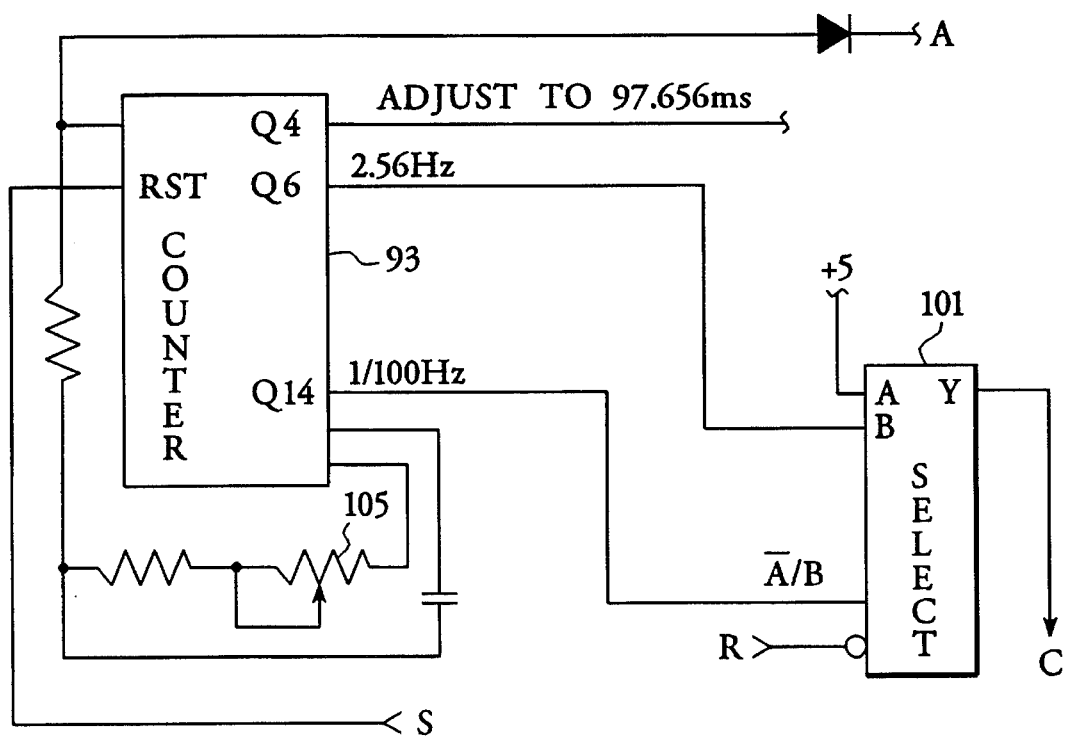
FIGS. 2A–2E are detailed circuit diagrams of various parts of the recording and playback device of FIG. 1. In particular.
Figure 2:
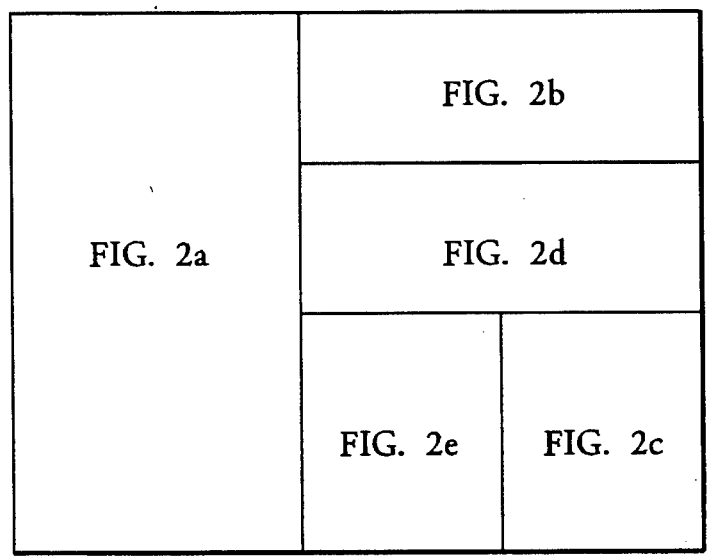
FIG. 2 is a map illustrating the basic layout of the circuit portions of FIGS. 2A–2E in an overall circuit.
Figure 2A:
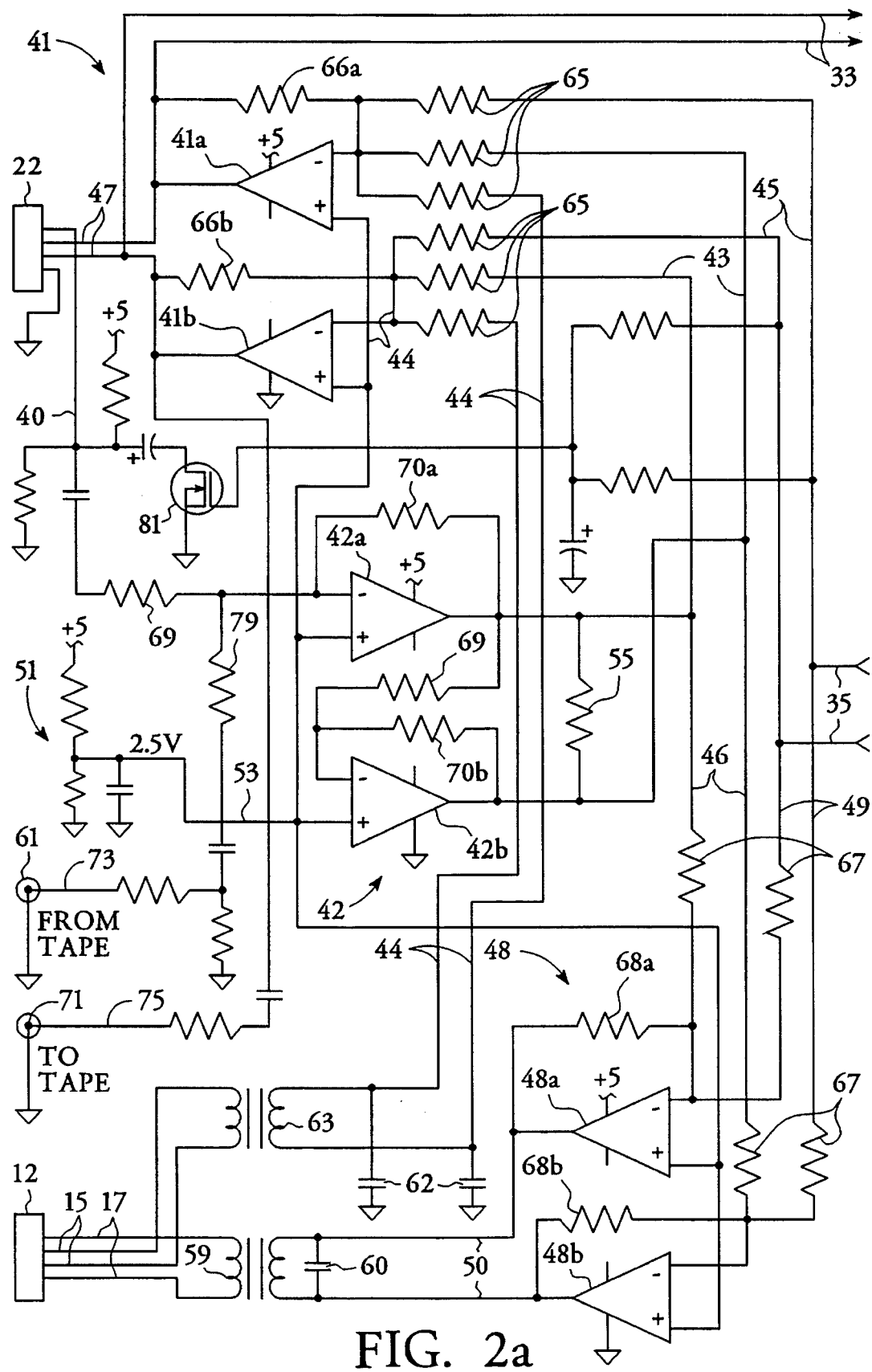

The recording and playback device 30 uses differential amplifiers 41, 42 and 48 to make these audio circuit connections. As seen in FIG. 2A, each of the audio channels 33, 35, 43–47, 49 and 50 is actually a pair of conductive lines, where the electrical signal carried on an audio channel is represented by the differences between the voltages (or currents) on a corresponding pair of these lines. The differential amplifiers 41, 42 and 48 are made up of pairs of operational amplifiers 41a and 41b, 42a and 42b, and 48a and 48b. The positive (+) inputs to the operational amplifiers are all biased at a constant voltage equal to half the supply voltage. In the case of a typical 5 V supply voltage, the voltage divider 51 provides a constant 2.5 V bias voltage on the line 53 leading to all of the positive (+) amplifier inputs.

Ordinarily, in a circuit powered from a single voltage supply, it is impossible to obtain negative voltages in any of the signal swings. A DC offset is present in all signals. In ordinary single-ended circuits, therefore, DC blocking capacitors are used to couple various sections of the circuit together. However, at the low frequencies found in telephone circuits (about 300 Hz), the capacitors need to have large capacitance values. Such capacitors are both bulky and costly. The main benefit for using differential connections is the elimination of such large coupling capacitors. The present differential circuit represents each signal as a pair of opposite phase signals, each biased at half the supply voltage, i.e., at 2.5 volts. One signal rises from its 2.5 V bias as the other signal falls. Each output of the pairs of operational amplifiers drives one end of a floating load. Differential pair 41a and 41b drives the telephone receiver's speaker via jack 22, differential pair 42a and 42b drives the resistor 55 and the inputs 33 of the storage chip 57, seen in FIG. 2E, and differential pair 48a and 48b drives the transformer 59 leading through the jack 12 into the telephone base unit. Since the differential outputs have opposite phases, the circuit is able to provide a strictly AC signal across the load element. Assuming the amplifiers 41a and 41b, 42a and 42b, and 48a and 48b can deliver signal outputs up to the supply voltage (5 volts), any voltage from $-V_{supply}$ to $+V_{supply}$ can be impressed across the floating load. In particular, the differential amplifier 48 is able to drive the transformer 59 directly with no large coupling capacitor, resulting in big space savings and a compact recording and playback device. The capacitor 60 across the transformer 59 typically has a capacitance of only 330 pF, while the capacitors 62 coupled to the transformer 63 have capacitances of just 0.1 µF, since they are used not as coupling capacitors, but for noise suppression.

As for the handset or headset's microphone, its output on line 40 is inherently single-ended. Likewise, the tape input through jack 61 is also single-ended. The differential amplifier 42 consists of two cascaded inverting operational amplifiers 42a and 42b that effectively convert the single-ended input signal for the handset or headset microphone or from the tape input jack 61 into a differential signal before combining it with other signals.

An important feature of the system is the manner in which sidetone provided to the handset or headset speaker is handled to avoid an objectionably strong sidetone signal. Since it is desirable to hear oneself in the handset or headset speaker when talking with somebody on the other end of the phone line, a sidetone signal is always provided from the handset or headset microphone to the handset or headset speaker. This signal is normally provided by the telephone base unit when the handset or headset is plugged directly into the base unit. In the present invention, sidetone is provided by the telephone base unit indirectly through the recording and playback device via transformer 63 and lines 44 to amplifiers 41*a* and 41*b*. Additional sidetone is provided from the handset or headset microphone via amplifiers 42*a* and 42*b* and lines 43 to amplifiers 41*a* and 41*b*. It is also desirable to hear oneself in the handset or headset speaker when previewing a message from the recording and playback device. Accordingly, sidetone is provided by the device along lines 45 to amplifiers 41*a* and 41*b*. The sidetone signals are combined by the amplifiers 41*a* and 41*b* to provide the signal on line 47 to the handset or headset speaker. If all of the sidetone signals were present together and in phase with one another, then the resulting sidetone signal level would provide an uncomfortably loud audio signal when added together. However, in the present invention, the circuit is arranged so that the sidetone signals do not have the same polarities or signal strength at the amplifiers 41*a* and 41*b*. Rather, the sidetone from the telephone base unit, arriving at the amplifiers 41*a* and 41*b* along lines 44, is made to have the opposite polarity from the sidetone from the handset's or headset's microphone output channel, arriving at the amplifiers 41*a* and 41*b* along lines 43. Further, the base unit sidetone is given twice the signal strength of the recording and playback sidetone by fixing the resistance of the input resistors 65 and 67 relative to the resistance of the feedback resistors 66*a*, 66*b*, 68*a* and 68*b*, according to well-known operational amplifier gain formulae. When a phone connection is established, the telephone sidetone has a signal strength of +2X, and the local sidetone has a signal strength of −X, where the "+" and "−" signs indicate the relative phase of the two sidetone signals. The sum of the sidetone signals is then +X. When no telephone connection has been established, i.e., off-line, when a message is being recorded into the recording and playback device, the telephone base unit's sidetone signal is absent, and the solitary sidetone signal has a strength of −X. Since the human ear cannot distinguish between signals of equal strength but opposite polarity, the apparent sidetone is the same, and the circuit does not suffer from additional sidetone when the system is on-line.

Typical resistance values for the feedback resistors 66*a*, 66*b*, 68*a*, 70*a* and 70*b* are 10 kΩ. Typical resistance values for input resistors 65 for the operational amplifiers 41*a* and 41*b* are 10 kΩ for the resistors on lines 43 and 44 and 470 kΩ for the resistors on lines 45. Typical resistance values for input resistors 67 are 1.5 kΩ for the resistors on lines 46 and 390 kΩ for the resistors on lines 49. Typical resistance values for the input resistors 69 and 79 into the microphone amplifiers 42*a* and 42*b* are 10 kΩ. Other resistances could be used instead.

Tape jacks 61 and 71 are optionally provided. Input tape jack 61 provides a single-ended signal on input line 73 to the operational amplifiers 42*a* and 42*b*. This allows a taped audio message to be loaded into the recording and playback device from a tape player through the input jack 61. Output tape jack 71 receives a single-ended signal on output line 75 from the operational amplifier 41*b*. This allows a message output from the recording and playback device to be saved to tape through the output jack 71.

Because of the way the system connects the recording and playback device and handset or headset to the base unit in a linear switchless arrangement, and because of the way sidetone is handled, multiple recording and playback devices 30 can be connected in series, to allow any one of several different messages to be delivered at the push of a button. FIG. 2A also shows a transistor 81 driven at its gate by the output channels 35 and 45 from the recording and playback device. The drain of transistor 81 is connected to the microphone output channel 40. Transistor 81 serves to mute the microphone channel 40 whenever a message is being output from the recording and playback device, so that background noise picked up by the microphone is not transmitted along with the prerecorded message to the called station over the telephone line.

Figure 2B:
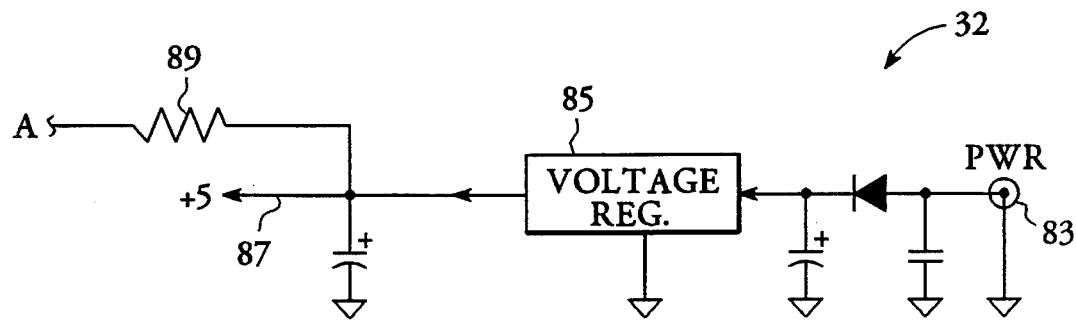

Referring to FIG. 2B, the recording and playback device runs from a +5 volt power supply. The unit is powered by an external self-controlled wall adaptor unit providing a +12 volts DC to a power input jack 83. A voltage regulator 85, typically an LM7805 chip, provides a constant 5 volt output 87. Some of the circuit elements may receive power through a load resistor 89, typically about 3.3 kΩ, whose output is designated as terminal A in FIG. 2B.

Figure 2C:
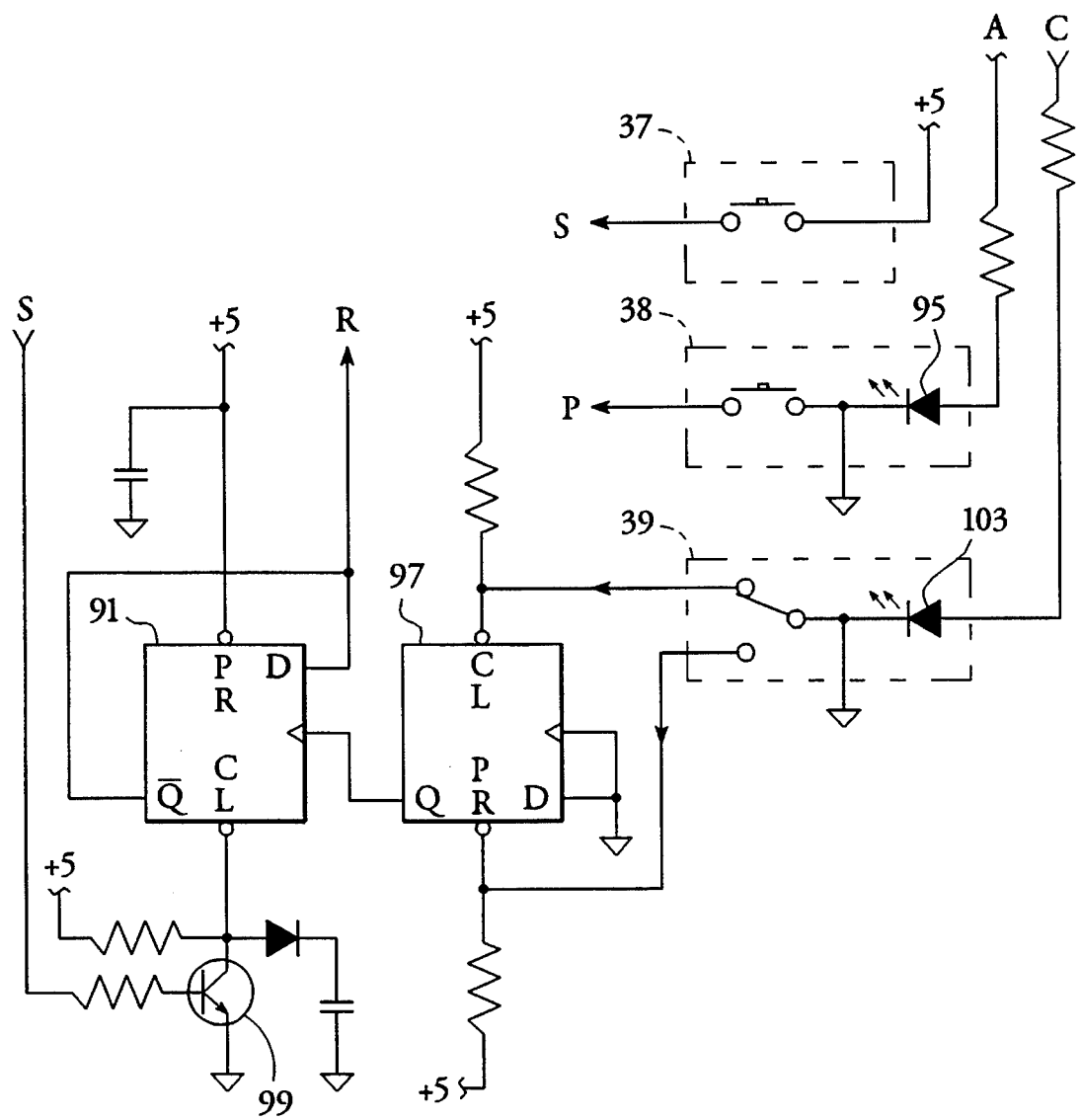
Figure 2E:
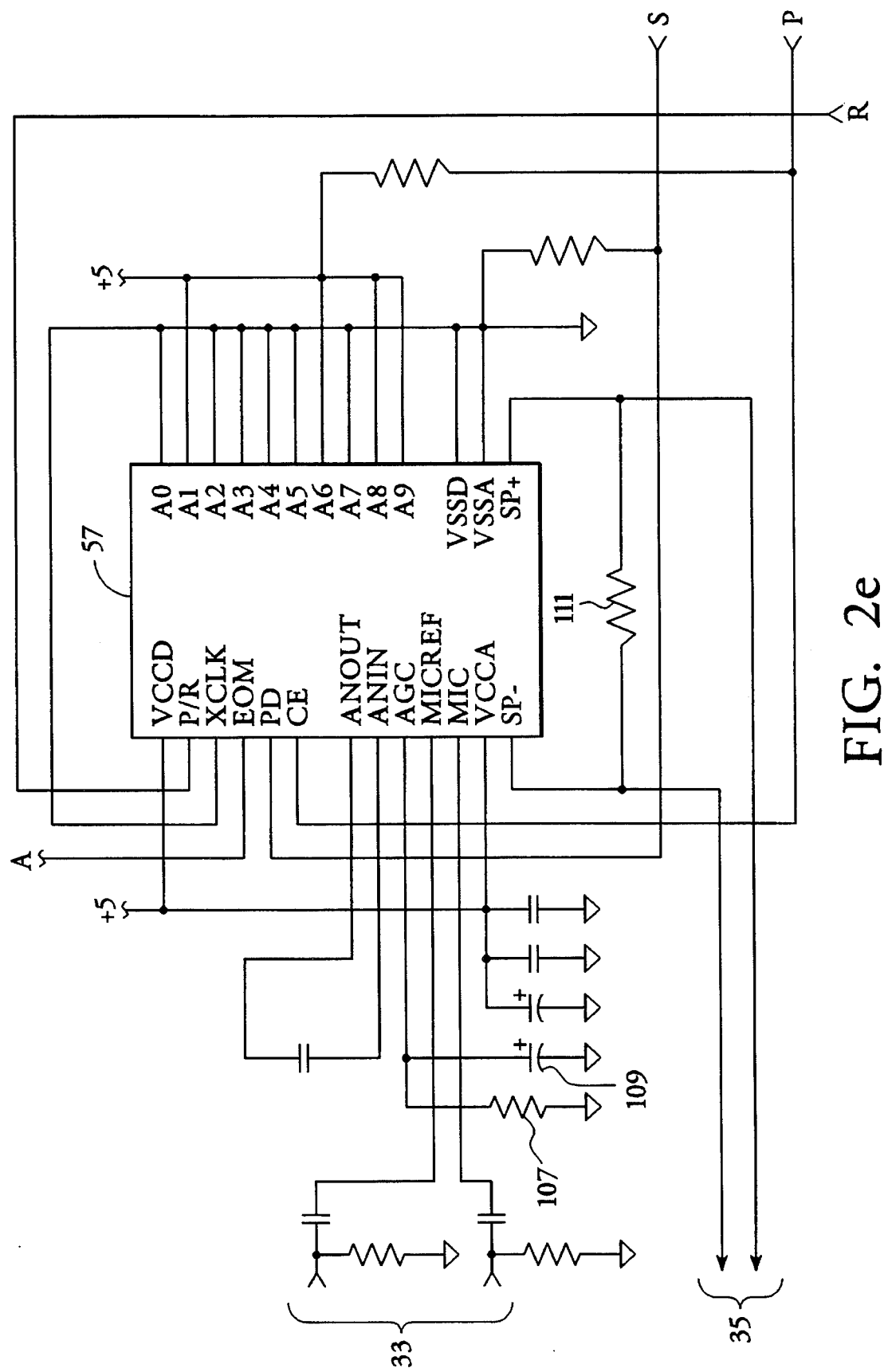

FIG. 2C shows the operation of the recording and playback device's buttons 37, 38 and 39. Pressing a stop button 37 causes a +5 volt pulse to be delivered through a terminal S. As seen in FIGS. 2C–2E, this pulse clears the flip-flop 91 responsible for providing a record enable signal, resets a counter 93 responsible for timing the length of a message being recorded, and powers down the message storage chip 57 containing the message being recorded into it or played back, so as to cease the recording or playback operation.

Pressing the play button 38 grounds the terminals P. As seen in Fig, 2E, this ground pulse activates the chip enable input CE of the storage chip 57, so as to initiate playback of the recorded message. An LED 95 emits light whenever the terminal A is at a high logic level to indicate the "play" status of the device.

Pressing the record button 39 causes the flip-flop 97 to be preset to an output Q of high logic level. When the record button 39 returns to its unpressed state, the flip-flop 97 is cleared to an output Q of low logic level. The output Q of flip-flop 97 is connected to the clock input of second flip-flop 91. The data input D and flip-flop output $\bar{Q}$ are coupled together in a feedback relationship. Thus, when the record button 39 is depressed, the resulting output at terminal R provides a record enable signal of low logic level. The stop button 37 provides the stop pulse on terminal S to the transistor 99, which clears the flip-flop 91, resulting in a non-enabling signal of high logic level at terminal R. As seen in FIG. 2E, the record enable signal from terminal R toggles the chip 57 from the playback mode to a record mode via the input P/R. The high logic level at terminal R returns the storage chip 57 to the playback mode. As seen in FIG. 2D, the record enable signal at terminal R also enables a select chip 101.

Referring now to FIG. 2D, a blinking light warns the user when he or she is nearing the end of the recording capacity of the storage chip 57. This light is the LED 103 on the record button 39 in FIG. 2C. Typically, the recording capacity of the storage chip 57 is about 60 or 90 seconds, depending on the chip used. The counter 93 is typically a 14-stage binary ripple counter with an oscillator, such as a 74HC4060 chip. The counter is connected as an RC oscillator with adjustable clock frequency, where the frequency adjustment is provided by a potentiometer 105. For a storage chip 57 with 60 seconds capacity and a blinking light warning of the end of capacity after 50 seconds, the clock frequency CLK should be set to 163.84 Hz. The Q4 output provides a clock signal with a frequency of CLK÷16. Its output should be adjusted, by adjusting potentiometer 105, to a 10.24 Hz frequency, i.e., a clock period of 97.656 ms. Then the Q6 output (frequency=CLK÷64) will have a 2.56 Hz frequency, and the Q14 output (frequency=CLK÷ 16384) will have a 0.01 Hz frequency, i.e., a half-period of 50 seconds. This Q14 output is connected to the select input A̅/B of the select chip 101. The select chip 101 may be a 74HC157 chip. When the record button is pushed, the select chip 101 first selects the +5 volt constant input A and presents it on output Y at terminal C. The record button's LED 103 outputs a steady light. After 50 seconds, the Q14 output of counter 93 switches to logic high and the select chip 101 selects the 2.56 Hz clock output from the counter's Q6 output input into the select chip 101 at input B. This clock signal is presented on its output Y at terminal C, and the LED 103 outputs a light that blinks off and on with a 2.56 Hz frequency. If a 90 second capacity recording chip 57 is used, a warning after about 80 seconds is desired. The Q4 output should be adjusted with potentiometer 105 to a 156.25 ms clock period. The Q14 output then has a half-period of 80 seconds. Either the 1.6 Hz Q6 output could be output into input B of the chip select or an alternate 3.2 Hz Q5 output could be used.

Referring now to FIG. 2E, the audio message recording chip 57 is typically an ISD2560 chip with a 60-second recording capacity. The recording and playback input channel 33 is connected to MIC and MICREF inputs of the chip, while the output channel 35 is connected to SP+ and SP− outputs of the chip. The chip 57 includes an automatic gain control input AGC coupled to a 470 kΩ resistor 107 and a 4.7 µF capacitor 109 to maintain a relatively constant recording level. The audio outputs SP+ and SP− are coupled across a typically 56 Ω resistor 111.

We claim:

1. An attended messaging system, comprising
   a telephone base means enabling a user to call and establish audio communication with a remote telephone station over an external telephone line,
   a telephone receiver means having a speaker for converting an electrical signal received from said telephone base means into an audio signal and having a microphone for converting an audio signal spoken into said microphone by the user into an electrical signal, and
   a message recording and playback device connected to both said telephone base means and said telephone receiver means,
   said message recording and playback device having a message storing means therein, said message recording and playback device also having a plurality of audio signal channels therein, each of said audio signal channels comprising a differential pair of signal lines, said plurality of audio signal channels including a first audio signal channel connecting said microphone of said telephone receiver means to an input of said telephone base means, a second audio signal channel connecting an output from said telephone base means to said speaker of said telephone receiver means, a third audio signal channel connecting said microphone of said telephone receiver means to said speaker of said telephone receiver means, a fourth audio signal channel connecting said microphone of said telephone receiver means to an input of said message storing means, a fifth audio signal channel connecting an output of said message storing means to said speaker of said telephone receiver means, and a sixth audio signal channel connecting said output of said message storing means to said input to said telephone base means, said message recording and playback device having manually-actuable recording and playback modes, a message spoken into said microphone of said telephone receiver means being stored in said message storing means whenever said message recording and playback device is in said recording mode, a message previously stored in said message storing means being communicated by said message recording and playback device through said telephone base means and said external telephone line to said remote telephone station with which the audio communication has been established whenever said message recording and playback device is in said playback mode, said message recording and playback device permitting the audio communication between said telephone receiver means and said designated remote telephone station whenever said message recording and playback device is in neither of said recording and playback modes.

2. The system of claim 1 wherein said message storing means of said message recording and playback device comprises a solid-state audio memory chip, said message spoken into said microphone being stored digitally in said solid-state audio memory chip.

3. The system of claim 1, wherein said microphone of said telephone receiver means is connected to said first, third and fourth audio signal channels via a first differential amplifier, said speaker of said telephone receiver means and said input to said message storing means are connected to said second, third, fourth and fifth audio signal channels via a second differential amplifier, and an input to said telephone base means is connected to said first and sixth audio signal channels via a third differential amplifier.

4. The system of claim 3 wherein each one of said differential amplifiers comprises a pair of operational amplifiers.

5. The system of claim 1 wherein said message recording and playback device includes timing means operable in said recording mode for enabling an indicating means when nearing end of recording capacity of said device.

6. The system of claim 1 wherein said message recording and playback device further includes external jack means for transferring an audio message between said message recording and playback device and an auxiliary message recording device.

7. An attended messaging system, comprising
   a telephone base means enabling a user to call and establish audio communication with a remote telephone station over an external telephone line,
   a telephone receiver means having a speaker for converting an electrical signal received from said telephone base means into an audio signal and having a microphone for converting an audio signal spoken into said microphone by the user into an electrical signal, and
   a message recording and playback device connected to both said telephone base means and said telephone receiver means, said message recording and playback device having manually-actuable recording and playback modes, a message spoken into said microphone of said telephone receiver means being stored in said message recording and playback device whenever said message recording and playback device is in said recording mode, a message previously stored in said message recording and playback device being communicated by said message recording and playback device through said telephone base means and said external telephone line to said remote telephone station with which the audio communication has been established whenever said message recording and playback device is in said playback mode, said message recording and playback device permitting the audio communication between said telephone receiver means and said remote telephone station whenever said message recording and playback device is in neither of said recording and playback modes, wherein said speaker of said telephone receiver means is connected to receive a first sidetone signal from said microphone of said telephone receiver means via a first signal path through said telephone base unit and a second sidetone signal from an output channel of said message recording and playback device via a second signal path, said first and second sidetone signals being of opposite polarity, said first sidetone signal having a signal strength which is twice that of a signal strength of said second sidetone signal.

8. The system of claim 7 wherein said signal strength of said respective first and second sidetone signal are determined by gain components of differential amplifiers in said first and second signal paths.

9. A device for connection to a telephone, comprising:

a first terminal connectable to a telephone base unit for enabling a user to communicate through said base unit with a remote telephone station which is called by the user over an external telephone line, a second terminal connectable to a telephone receiver unit for enabling the user to communicate through said receiver unit with the remote telephone station, an audio message storage unit, and a plurality of audio signal channels, each of said audio signal channels comprising a differential pair of signal lines, said plurality of audio signal channels including a first audio signal channel connecting incoming signal lines of said second terminal to outgoing signal lines of said first terminal, a second audio signal channel connecting incoming signal lines of said first terminal to outgoing signal lines of said second terminal, a third audio signal channel connecting said incoming signal lines of said second terminal to said outgoing signal lines of said second terminal, a fourth audio signal channel connecting said incoming signal lines of said second terminal to an input of said audio message storage unit, a fifth audio signal channel connecting an output of said audio message storage unit to said outgoing signal lines of said second terminal, and a sixth audio signal channel connecting said output of said audio message storage unit to said outgoing signal lines of said first terminal, said audio message storage unit having manually-actuable recording and playback modes, a message received through said second terminal being stored in said audio message storage unit whenever said audio message storage unit is in said recording mode, a message previously stored in said audio message storage unit being communicated by said audio message storage unit through said first terminal whenever said audio message storage unit is in said playback mode, said audio message storage unit permitting audio communication between said first and second terminals whenever said audio message storage unit is in neither of said recording and playback modes.

10. The device of claim 9 wherein said audio message storage unit comprises a solid-state audio memory chip for storing in digital form said message received through said second terminal.

11. The device of claim 9 wherein said incoming lines of said second terminal are connected to said first, third and fourth audio signal channels via a first differential amplifier, said outgoing lines of said second terminal and said input to said audio message storage unit are connected to said second, third, fourth and fifth audio signal channels via a second differential amplifier, and said outgoing lines of said first terminal are connected to said first and sixth audio signal channels via a third differential amplifier.

12. The device of claim 11 wherein each one of said differential amplifiers comprises a pair of operational amplifiers.

13. The device of claim 11 wherein a first sidetone signal is provided via said first and second audio signal channels to said outgoing lines of said second terminal and a second sidetone signal of opposite polarity to said first sidetone signal is provided via said third audio signal channel to said outgoing lines of said second terminal, said first sidetone signal having a signal strength which is twice that of a signal strength of said second sidetone signal.

14. The device of claim 9 further comprising timing means operable in said recording mode of said audio message storage unit for enabling an indicating means when nearing end of recording capacity of said audio message storage unit.

15. The device of claim 9 further comprising external jack means connectable to an auxiliary message recording device, and a seventh audio signal channel connecting said output of said audio message storage unit to said external jack means.

* * * * *